United States Patent [19]

Curtis et al.

[11] Patent Number: 5,896,531

[45] Date of Patent: Apr. 20, 1999

[54] METHOD AND SYSTEM FOR MANAGING ENVIRONMENTS WITH A DATA PROCESSING SYSTEM

[75] Inventors: Donald E. Curtis, Kennesaw; W. Pettus Gewin, Marietta; Thomas F. Mitchell, Alpharetta; Michael P. Priven, Marietta; William L. Rich, Stone Mountain; Kathleen K. Tubbs, Marietta, all of Ga.

[73] Assignee: International Business Machines Corporation, Armonk, N.Y.

[21] Appl. No.: 08/023,994

[22] Filed: Feb. 26, 1993

[51] Int. Cl.[6] .................................................. G06F 9/00
[52] U.S. Cl. ..................... 395/674; 395/200.03; 395/651
[58] Field of Search ................................. 395/650, 800, 395/500, 624, 200.03, 651, 652

[56] References Cited

U.S. PATENT DOCUMENTS

| | | | |
|---|---|---|---|
| 4,425,618 | 1/1984 | Bishop et al. | 364/300 |
| 4,558,413 | 12/1985 | Schmidt et al. | 364/300 |
| 4,575,827 | 3/1986 | Kulakowski | 365/230 |
| 4,627,019 | 12/1986 | Ng | 364/900 |
| 4,635,189 | 1/1987 | Kendall | 364/200 |
| 4,641,274 | 2/1987 | Swank | 364/900 |
| 4,646,229 | 2/1987 | Boyle | 364/200 |
| 4,686,620 | 8/1987 | Ng | 364/200 |
| 4,780,821 | 10/1988 | Crossley | 395/670 |
| 4,949,248 | 8/1990 | Caro | 364/200.33 |
| 5,109,510 | 4/1992 | Baker et al. | 395/674 |
| 5,261,080 | 11/1993 | Khoyi et al. | 395/500 |
| 5,303,369 | 4/1994 | Borcherding et al. | 395/674 |
| 5,303,379 | 4/1994 | Khoyi et al. | 395/710 |
| 5,317,754 | 5/1994 | Blandy et al. | 364/228.2 |
| 5,337,412 | 8/1994 | Baker et al. | 395/406 |
| 5,345,588 | 9/1994 | Greenwood et al. | 395/677 |
| 5,369,778 | 11/1994 | Soucie et al. | 307/103 |
| 5,379,431 | 1/1995 | Lemon et al. | 395/830 |
| 5,497,463 | 3/1996 | Stein et al. | 395/200.03 |

OTHER PUBLICATIONS

Software–Practice and Experience, vol. 15(7), 637–654 Jul. 1985 Walter F. Tichy "RCS—A System For Version Control".

IEEE 1982, 0270/5257/82/0000/0058S00.75, Walter F. Tichy, pp. 58–67 "Design, Implementation, and Evaluation of a Revision Control System".

IEEE Transactions on Software engineering, vol. SE–1, No. 4, Dec. 1975 "The Source Code Control System", Mark J. Rochkind, pp. 364–370.

*Primary Examiner*—Majid A. Banankhan
*Attorney, Agent, or Firm*—Kenneth A. Seaman; Daniel E. Venglarik; Andrew J. Dillon

[57] ABSTRACT

A method and system of increasing efficiency within a data processing system having multiple applications executing within the data processing system. Each of the applications requires a specific environment. A collection of parameters which specify an environment is stored within the data processing system in response to an initialization of the environment for utilization by a first application. Next, the minimal requirements of an second application requesting an environment are determined in response to an attempted initialization of the second application. An existing environment is then utilized if the collection of parameters specifying the environment meets the minimal requirements of the second application, wherein data processing efficiency is increased.

22 Claims, 8 Drawing Sheets

METHOD AND SYSTEM FOR MANAGING ENVIRONMENTS WITH A DATA PROCESSING SYSTEM

BACKGROUND OF THE INVENTION

1. Technical Field

The present invention relates in general to an improved data processing system and in particular to a method and system for improving the efficiency of an environment established within a data processing system. Still more particularly, the present invention relates to a method and system for improving the efficiency of an environment established in a data processing system by reducing the initialization time required for the environment.

2. Description of the Related Art

In large software systems and environments located within a data processing system, performance may be hampered due to various factors. For example, in object-oriented software systems and environments, general performance problems may be attributed to the dynamic nature of object-oriented programming and to some extent, to specific implementations of the methodology and/or the run time environment. In a production environment (i.e., an environment where an end user object-oriented system is installed and operating on a day-to-day basis), one specific aspect of the performance problem tends to be the time required to instantiate and initialize objects and their associated classes upon entry into the object-oriented environment. For example, each time the environment is started or invoked some amount of initialization is required in order to perform some function for a user. A large part of this initialization is simply instantiating and initializing objects and their associated classes that are going to be utilized continuously and have some initial or default values. The environment may be started for various purposes, such as a single user session, a communication session, or some batch processing session. In each case, the object-oriented environment must be initialized.

Therefore, it would be desirable to have a method and system for reducing the time necessary to provide a data processing environment for a particular task.

SUMMARY OF THE INVENTION

It is therefore one object of the present invention to provide an improved data processing system.

It is another object of the present invention to provide a method and system for improving the efficiency of an environment established within a data processing system.

It is yet another object of the present invention to provide a method and system for improving the efficiency of an environment established in a data processing system by reducing the initialization required time for the environment.

The foregoing objects are achieved as is now described. The present invention provides a method and system of increasing efficiency within a data processing system having multiple applications executing within the data processing system. Each of the applications requires a specific environment. A collection of parameters which specify an environment is stored within the data processing system in response to an initialization of the environment for utilization by a first application. Next, the minimal requirements of a second application requesting an environment are determined in response to an attempted initialization of the second application. An existing environment is then utilized if the collection of parameters specifying the environment meets the minimal requirements of the second application, wherein data processing efficiency is increased.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
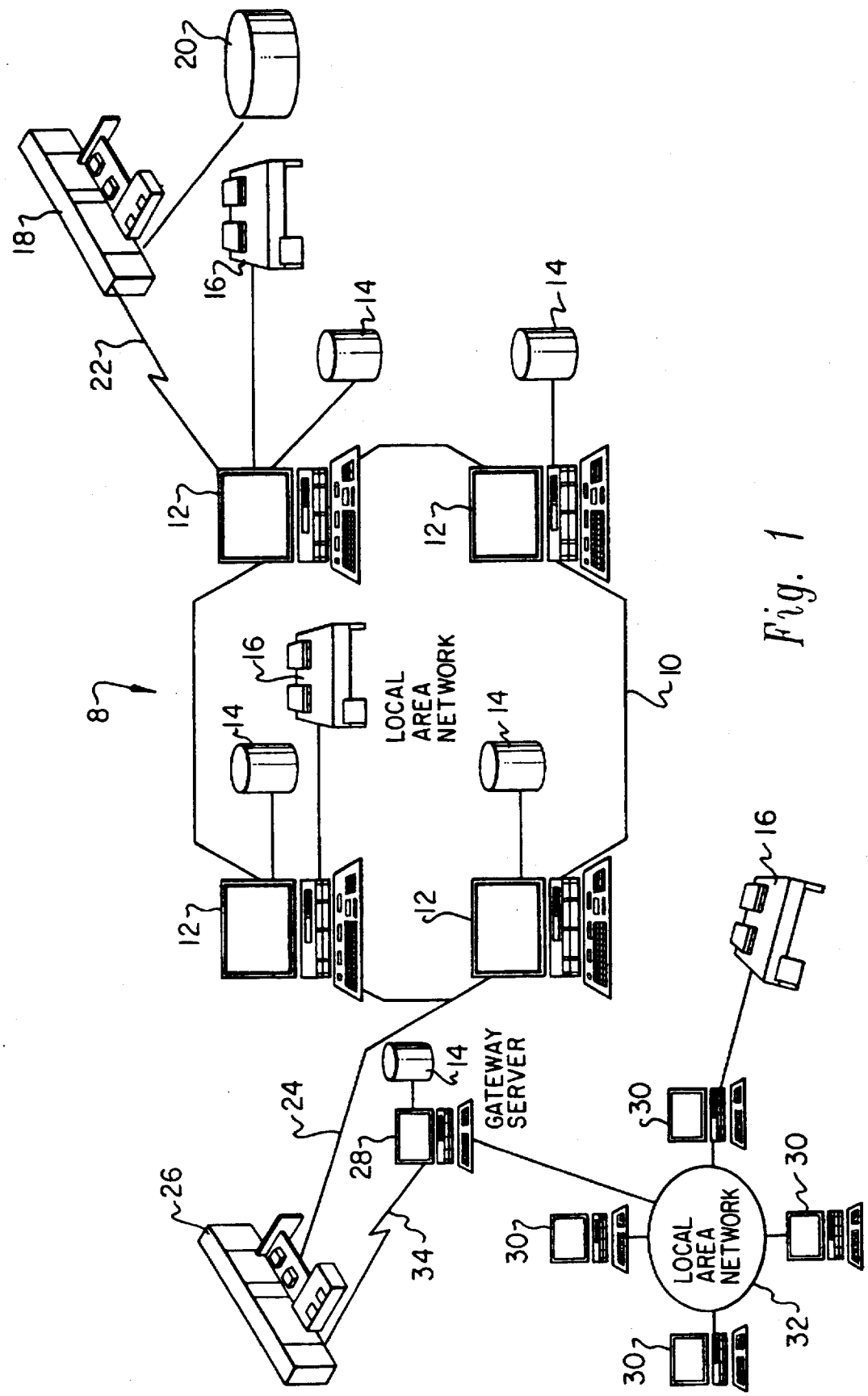
FIG. 1 depicts a pictorial representation of a data processing system which may be utilized to implement a method and system of the present invention.

With reference now to the figures, and in particular with reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12 and 30, respectively. Computers 12 and 30 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing a Enterprise Systems Architecture/370 (also called an "ESA/370") or an Enterprise Systems Architecture/390 (also called an "ESA/390") computer available from IBM. Depending on the application a mid-range computer, such as a Application System/400 (also called an "AS/400"), may be employed. "Enterprise Systems Architecture/370", "ESA/370", "Enterprise Systems Architecture/390", and "ESA/390" are trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, a plurality of documents or resource objects may be stored within storage device 20 and controlled by mainframe computer 18, as Resource Manager or Library Service for the resource objects are thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2A:
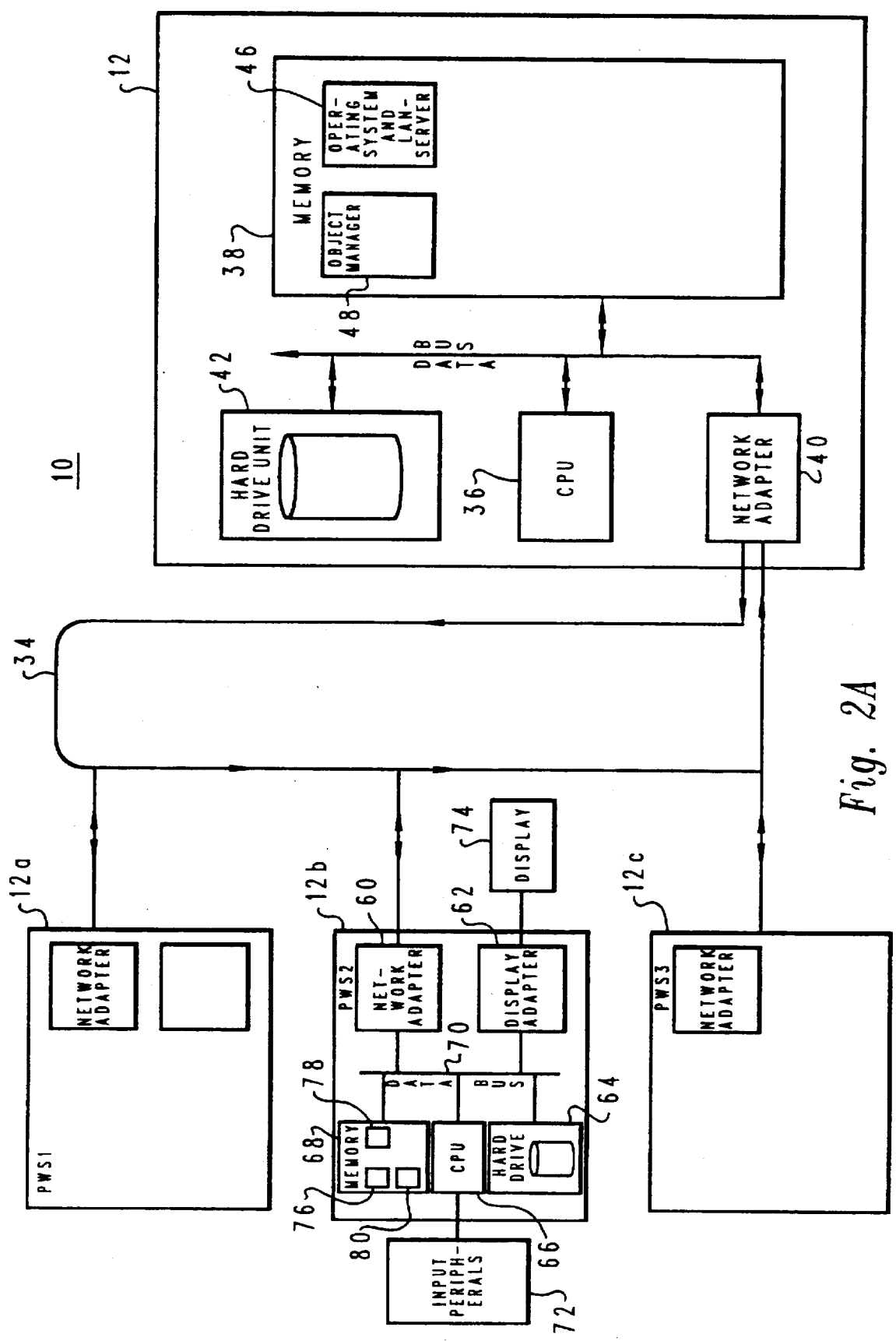
FIG. 2A is a block diagram of a LAN in which a method and system in accordance with a preferred embodiment of the present invention may be implemented.

Referring now to FIG. 2A, a block diagram of LAN 10 is depicted in which a method and system in accordance with a preferred embodiment of the present invention may be implemented. Server 12 communicates with computers 12a–12c over communications channel 34. LAN 10 is depicted in a Token Ring geometry, however, other geometries are possible. Server 12 may be a conventional computer, such as an IBM PS/2, a ESA/370, a ESA/390, or AS/400 system programmed to practice this invention. Server 12 includes a central processing unit (CPU) 36, a memory 38, and a network adapter 40. Network adapter 40 is utilized for formatting outgoing transmissions and deformatting incoming transmissions. Server 12 also includes a hard drive unit 42 for storing data, which may include object management environments (OMEs) in accordance with a preferred embodiment of the present invention. Request for data results in the transfer of the requested data to computer memory 38 over data bus 44. An operating system and local area network server 46 are represented as one object within memory 38. Various users may access OMEs located in server 12 by sending a request to object manager 48 utilizing computers 12a–12c.

Computer 12b is a typical example of a computer that may be utilized in accordance with a preferred embodiment of the present invention. Computer 12b operates as a personal work station communicating with server 12. Schematically, computer 12b is substantially similar to server 12, and includes a network adapter 60, a display adapter 62, a hard drive unit 64, a CPU 66, and memory 68. Components of computer 12b transfer data over data bus 70. CPU 66 directly controls input peripherals 72, which may include a keyboard and a mouse. Display adapter 62 drives display device 74. Memory 68 may include operating system 76, object manager 78 and OME 80. OME 80 may be an OME containing objects utilized to communicate with server 12. In accordance with a preferred embodiment of the present invention, OME 80 may be utilized to reduce the time necessary to connect to server 12. By utilizing OME 80 when communications with server 12 are desired, objects do not need to be initialized since they are already contained in OME 80. Other OMEs may be located within memory 68. Additionally, other OMEs may be accessed and supplied by server 12 to various computers within LAN 10.

Figure 2B:
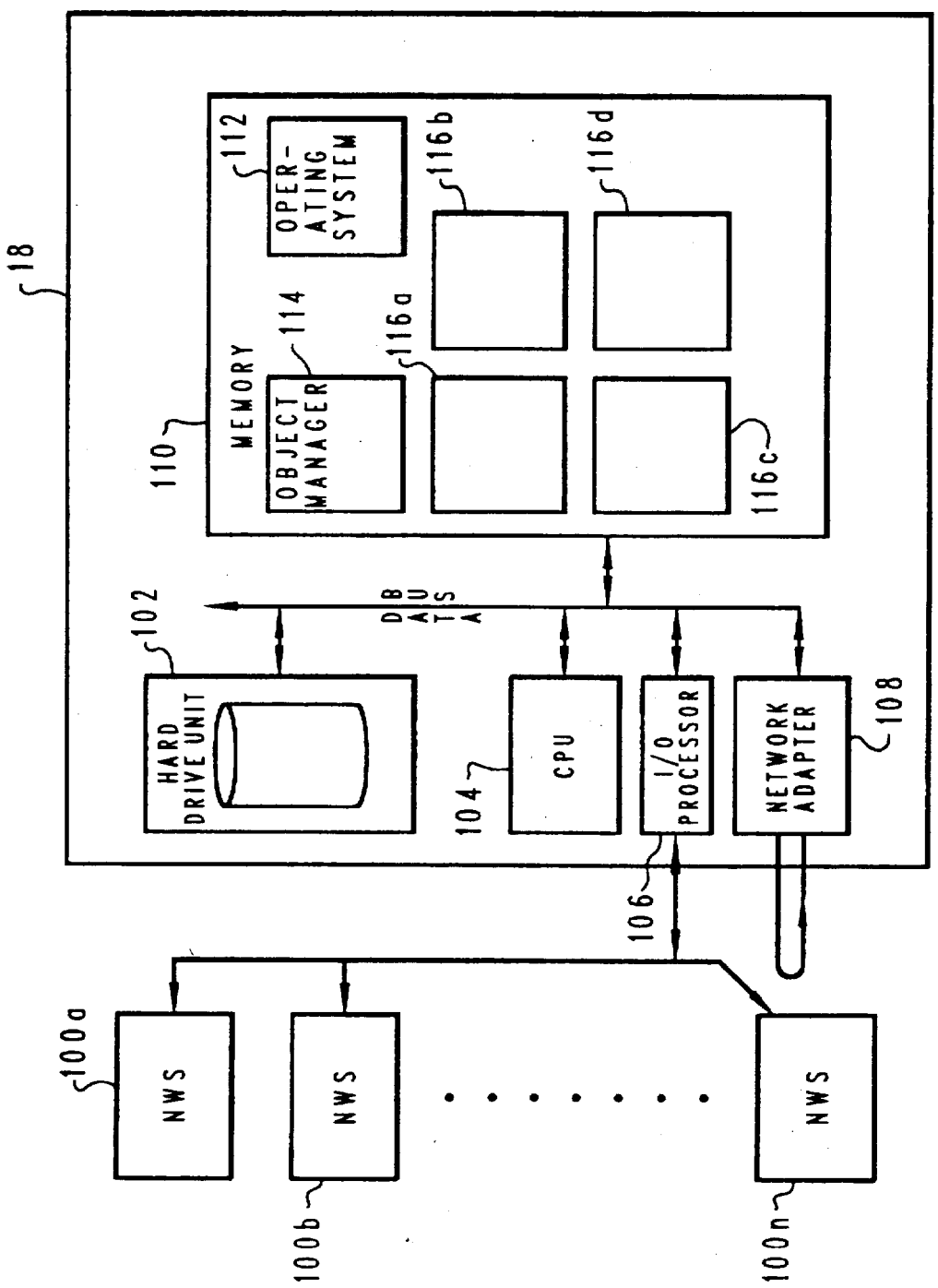
FIG. 2B is a block diagram of a mainframe computer in which a method and system in accordance with a preferred embodiment of the present invention may be implemented.

Referring now to FIG. 2B, a block diagram depicts a mainframe computer 18 in which a method and system in accordance with a preferred embodiment of the present invention may be implemented. Mainframe computer 18 is a single computer system running multiple processes, such as an IBM ESA/370 or ESA/390, attached to multiple nonprogrammable work stations (NWS) 100a–100n. Mainframe computer 18 includes a hard drive unit 102, a CPU 104, an input/output (I/O) processor 106 for communicating with nonprogrammable work stations 100a–100n, network adapter 108, and memory 110. Hard drive unit 102 may include multiple hard drives within it and may store OMEs in accordance with a preferred embodiment of the present invention. Operating system 112 is located within memory 110. Additionally, memory 110 includes object manager 114 and a number of OMEs, such as OMEs 116a–116d. These OMEs may be utilized by mainframe computer 18 or by NWS 100a–100n in accordance with a preferred embodiment of the present invention.

Under a preferred embodiment of the present invention, the operating state of an object management environment, including all of the instantiated and initialized objects, may be saved or maintained in memory for use at some later point in time by a temporally different task or application other than the one that originally created the environment.

An object management environment (OME) is any mechanism or system for managing classes, objects, messaging, etc., in a data processing system environment and includes objects being managed. "Managing" includes, for example, storing and tracking instances, routing messages, instantiating, and initializing new objects. The OME consists of control structures and supporting functions that tie together all aspects of the operating environment within a central, logically single, controlling entity in accordance with a preferred embodiment of the present invention. Parameters may be utilized to specify these structures and supporting functions in accordance with a preferred embodiment of the present invention.

The physical structures in the OME are all tied together or anchored by an anchor block that maintains references to all of the various parts of the OME in accordance with a preferred embodiment of the present invention. The various parts are themselves connected to more detailed, relevant pieces of information or parameters in accordance with a preferred embodiment of the present invention. The anchor block provides a single point of reference to the whole OME. The anchor block may be referenced by a single address, which is the beginning of a structure that allows an object manager to find anything within the environment.

Although the depicted embodiment is directed towards OME management in an object-oriented environment, those skilled in the art will realize the method and system of the present invention may be applied to other environments.

Figure 3:
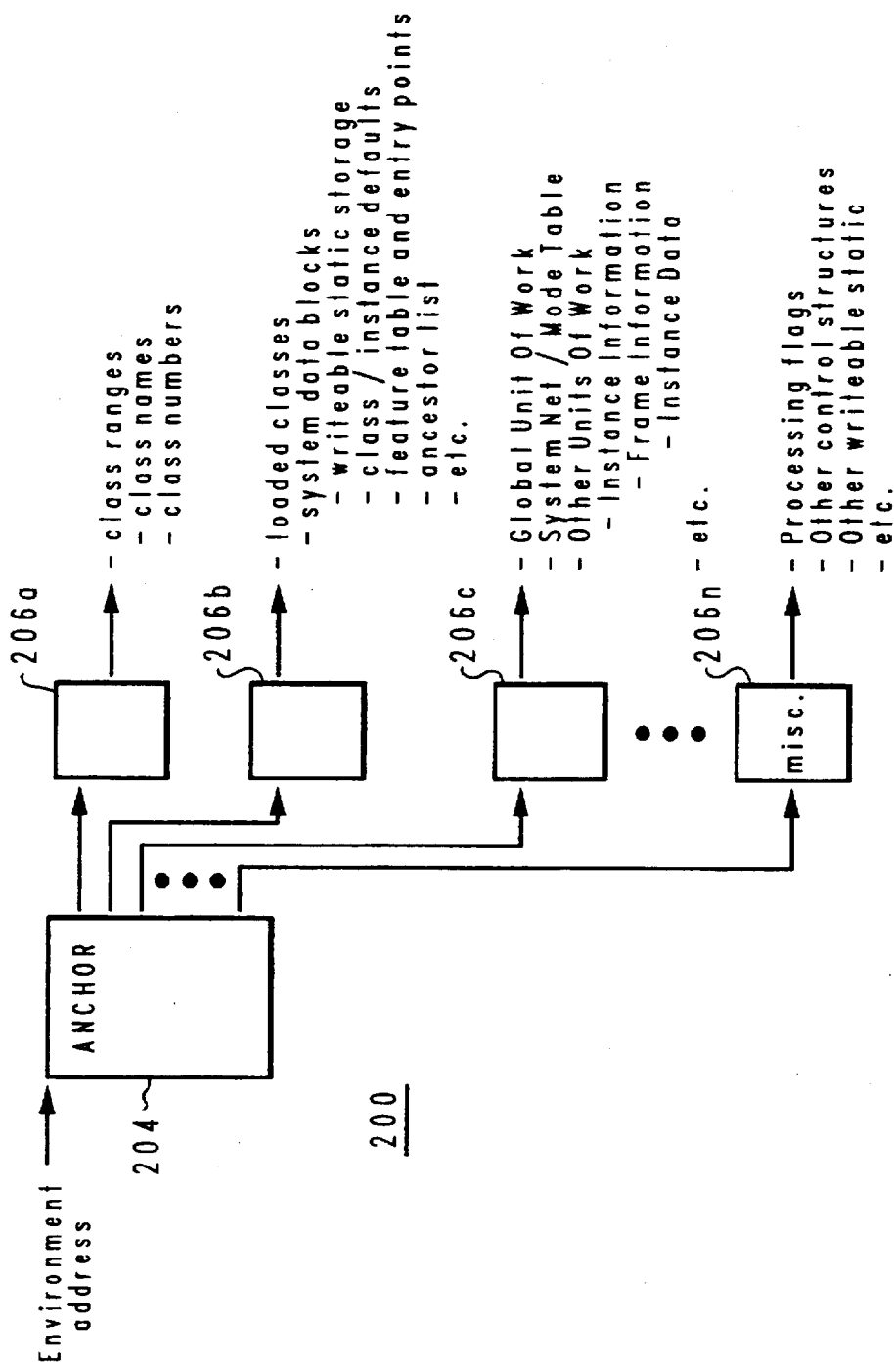
FIG. 3 is a block diagram illustrating portions of an object management environment in accordance with a preferred embodiment of the present invention.

Referring now to FIG. 3, a block diagram illustrates the portions of an OME in accordance with a preferred embodiment of the present invention. OME 200 includes various components such as anchor block 204 and blocks 206a–206n. Blocks 206a–206n contain various parts of OME 200. For example, block 206a contains data defining class ranges, such as class names and class numbers. Block 206b contains loaded class information defined by system data blocks, such as, for example writable static data storage, class/instance defaults, feature table and entry points, and ancestor list. Block 206c includes global unit of work, system net/node table, and other units of work, such as instance information which contains frame information containing instance data. Block 206n contains miscellaneous information such as processing flags, other control structures, and other writable static storage. Blocks 206a–206n may be addressed utilizing anchor block 204. Those skilled in the art will realize that numerous other structures may be found within an OME other than those depicted in FIG. 3. As mentioned before, anchor block 204 provides a single point of reference to the entire OME. The anchor block is accessed by knowing its address point or environment address. OMEs, object managers, and their implementation are well know to those skilled in the art.

An object manager is a single, logical process that provides the capability to traverse the anchor block and various structures within the OME. The object manager actually handles message routing, determines whether a class needs to be loaded, whether an object needs to be initialized, and tracks objects currently accessible by the system. Object managers, their designs and implementations, are well known to those skilled in the art. One such system recognized by those skilled in the art of object-oriented programming is documented in good detail by "Smalltalk-80: The Language and its Implementation" by Adele Goldberg and David Robson (1983, Addison-Wesley, Reading, Mass.). Algorithms for constructing and traversing computer information and control structures are given in precise detail by "The Art of Computer Programming: Volume 1: Fundamental Algorithms" By Donald E. Knuth (1969, Addison-Wesley, Reading, Mass.).

Figure 4:
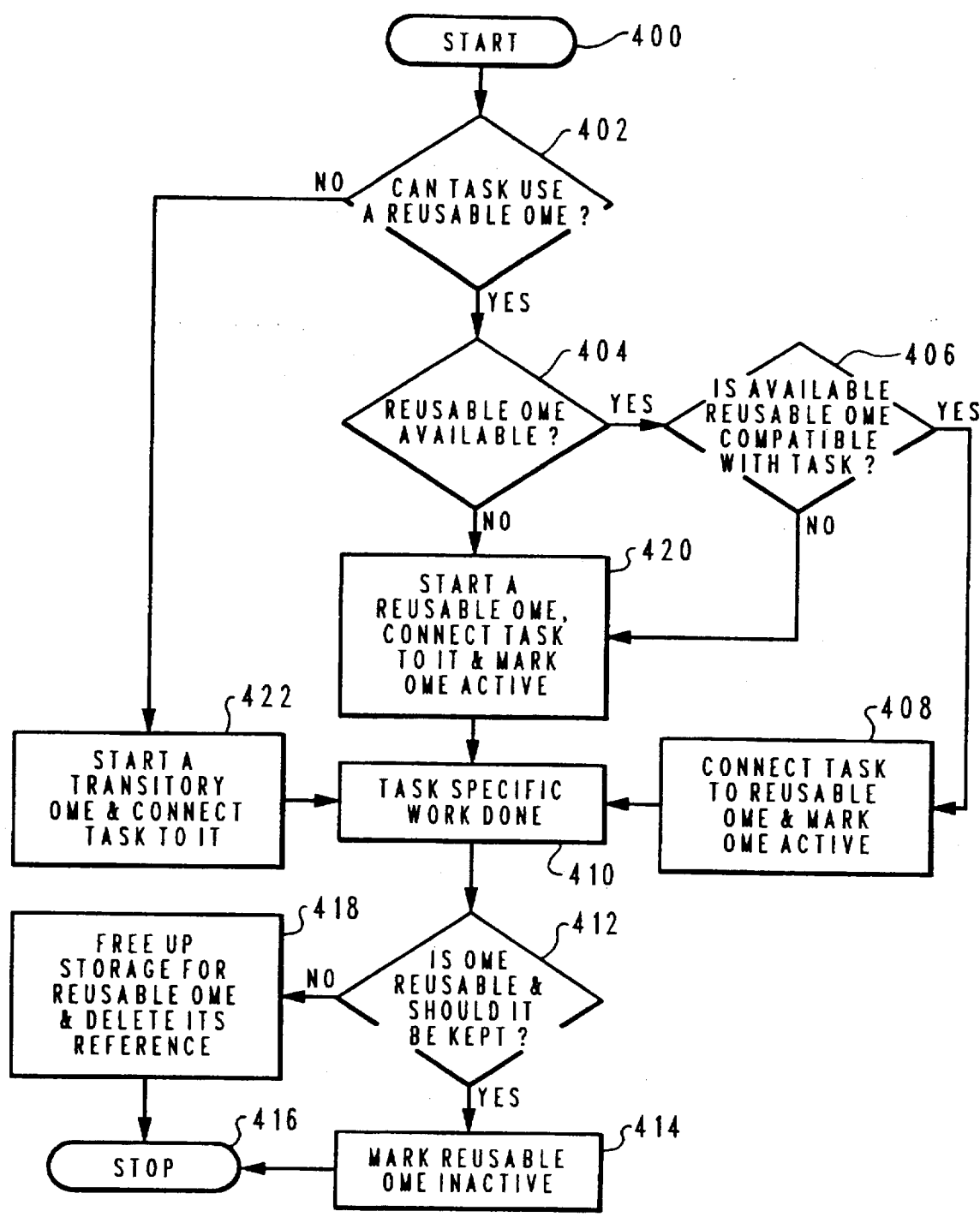
FIG. 4 depicts a flowchart of a method and system for managing environments within a data processing system in accordance with a preferred embodiment of the present invention.

Referring now to FIG. 4, a flowchart depicting a method and system for managing environments within a data processing system is depicted in accordance with a preferred embodiment of the present invention. As illustrated, the process begins in block 400 and thereafter proceeds to block 402, which depicts a determination of whether or not the task can utilize a reusable OME. If the task can utilize a reusable OME, the process then advances to block 404. Block 404 illustrates a determination of whether or not a reusable OME is available. If a reusable OME is available, the process then proceeds to block 406. Block 406 depicts a determination of whether or not the available reusable OME is compatible with the task. Compatibility between the task and a reusable OME may be determined in various ways well known to those skilled in the art. In accordance with a preferred embodiment of the present invention, parameters specifying the reusable OME may be compared to the minimal requirements of the task.

Compatibility with the task results in the process proceeding to block 408, which illustrates the connection of the task to the reusable OME and marking the OME as being active. In accordance with a preferred embodiment of the present invention, the task may be connected to the reusable OME by passing a pointer to the anchor block of the reusable OME. Those skilled in the art will realize that various mechanisms may be employed to connect a task to an OME and that these mechanisms will vary depended on the structure of the OME.

Thereafter, the process proceeds to block 410. Block 410 depicts the processing of task specific work. Afterward, a determination of whether or not the OME is reusable and whether it should be kept maintained within the data processing system is illustrated in block 412. If the OME is reusable and should be kept or maintained within the data processing system, the process then advances to block 414, which depicts the marking of the reusable OME as being inactive, signaling that the OME may be reused the next time a request for a reusable OME occurs. An OME is marked inactive in order to signify that the OME is still usable. A failure in the data processing system that prevents the marking of the OME as being inactive will result in the OME being discarded at a later time in accordance with a preferred embodiment of the present invention. Thereafter, the process terminates as illustrated in block 416.

Referring back to block 412, if the OME is not reusable, or the OME should not be kept or maintained, the process then proceeds to block 418. Block 418 depicts the freeing up of the reusable OME storage and the deletion of the reference to the OME. Again, the process terminates in block 416.

Referring back to block 404, if a reusable OME is unavailable, the process advances to block 420. Block 420 illustrates the starting of a reusable OME and the connection of the task to it. Additionally, the OME is marked as active. The process also proceeds to block 420 from block 406 if a determination that the available OME is incompatible with the task is made. Thereafter, from block 420, the process proceeds to block 410 for processing of task specific work.

Referring again to block 402, if the task cannot utilize a reusable OME, the process advances to block 422, which depicts the starting of a transitory OME and the connection of the task to it. Again, the process thereafter proceeds to block 410 and processes task specific work.

Figure 5A:
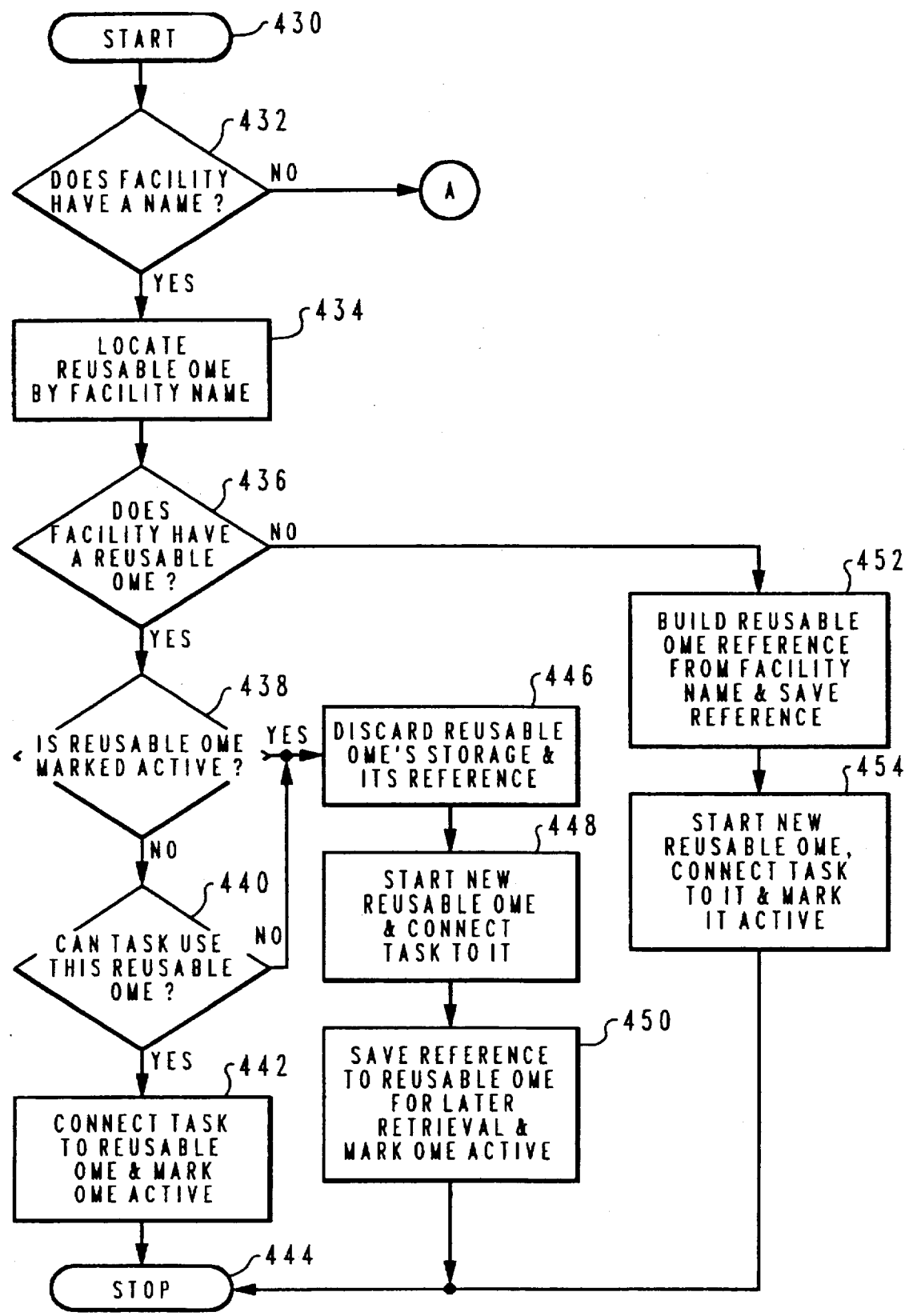
FIGS. 5A and 5B depict a flowchart of a method and system for connecting both a named and unnamed reusable object management environment to a task in accordance with a preferred embodiment of the present invention.
Figure 5B:
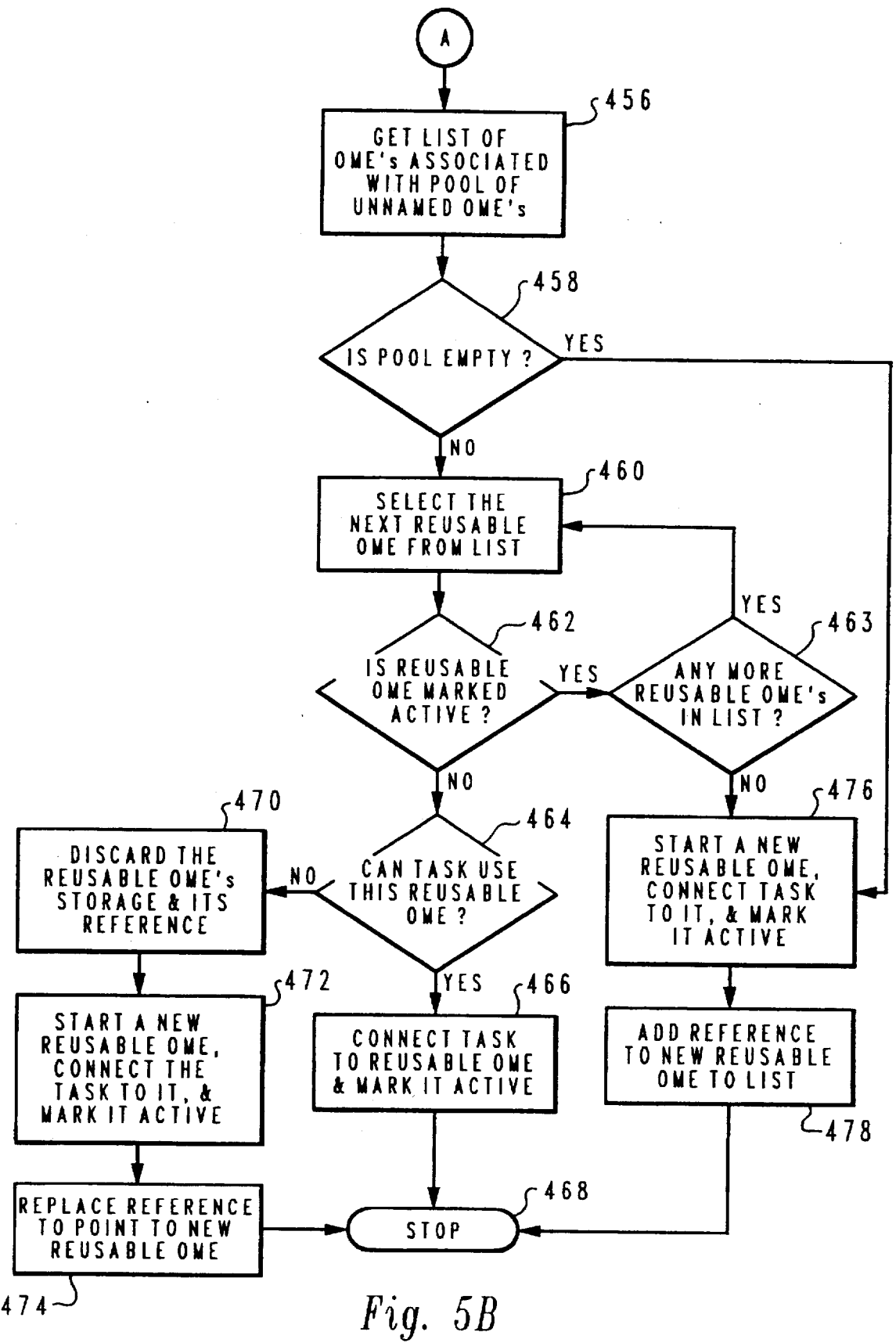

Referring now to FIGS. 5A and 5B, a flowchart illustrating a method and system for connecting both a named and an unnamed reusable OME to a facility is depicted in accordance with a preferred embodiment of the present invention. This flowchart is a more detailed description of the processes described in blocks 404, 406, 408, and 420 in FIG. 4.

As illustrated, the process begins in block 430 and thereafter proceeds to block 432, which depicts a determination of whether or not the facility has a name. A named facility may be, for example, a nonprogrammable workstation or a computer connected to a LAN in accordance with a preferred embodiment of the present invention. If the facility has a name, the process then advances to block 434. Block 434 illustrates the locating of a reusable OME by the facility name. An OME may be located by a reference. In the case of named facilities, the references correspond to the facility name. The reference is merely a mechanism, such as a tag or label associated with an OME, which allows the OME to be identified and located in accordance with a preferred embodiment of the present invention. Each facility has associated with it an OME for performing tasks in accordance with a preferred embodiment of the present invention.

Next, a determination of whether or not the facility has a reusable OME is illustrated in block 436. If the facility has a reusable OME, the process then advances to block 438, which depicts a determination of whether or not the reusable OME is marked active. If the reusable OME is not marked active, the process then proceeds to block 440. Block 440 illustrates a determination of whether or not the task can utilize the reusable OME. If the task can utilize the reusable OME, the process advances to block 442, which depicts the connection of the task to the OME and the marking of the OME as active. Thereafter, the process terminates as illustrated in block 444.

Referring back to block 440, if the task cannot use the reusable OME, the process then advances to block 446. Block 446 depicts the discarding of the reusable OME's storage and its reference. Afterward, a new reusable OME is started and the task is connected to it as illustrated in block 448. Thereafter, the process advances to block 450. Block 450 depicts the saving of the reference to the OME for later retrieval and the marking of the OME as active. The process then terminates in block 444.

The process in blocks 466, 468, and 450 are followed from block 438 if a determination is made that the reusable OME is marked active.

Referring again to block 436, if the facility does not have an OME, the process then advances to block 452. Block 452 illustrates the building of the OME reference from the facility name and the saving of the reference for later retrieval. Afterward, the process advances to block 454, which depicts the starting of a new reusable OME and the connection of the task to it. Additionally, block 454 illustrates the marking of the reusable OME as active. Thereafter, the process terminates in block 444.

Referring back to block 432, if the facility does not have a name, the process then proceeds to block 456 in FIG. 5B via connector A. An unnamed facility may be, for example, a task or application involving batch processing or timed processing. Block 456 illustrates the obtaining of a list of OMEs identifying a pool of unnamed reusable OMEs. Thereafter, the process proceeds to block 458, which depicts a determination of whether or not the pool of unnamed reusable OMEs is empty. If the pool is not empty, the process then advances to block 460. Block 460 illustrates the selection of the next reusable OME from the list of OMEs. Afterward, a determination of whether or not the reusable OME selected is marked as active is depicted in block 462. If the OME is active, control passes to block 463, which depicts a determination as to whether any more OME remain in the list. If so, control returns to block 460. If the determination of block 462 indicates that the OME is not marked as active, a determination of whether or not the task can utilize the reusable OME is illustrated in block 464. If the task can utilize the reusable OME, the process then proceeds to block 466, which depicts the connection of the task to the selected reusable OME and the marking of the selected reusable OME as active. Thereafter, the process terminates as illustrated in block 468.

Referring again to block 464, if the task cannot utilize the reusable OME, the process then advances to block 470. Block 470 illustrates the discarding of the reusable OME's storage and its reference. Afterward, the process proceeds to block 472. Block 472 depicts the starting of a new reusable OME and the connection of the task to it. Additionally, the reusable OME is marked as active. The process then advances to block 474, which illustrates the replacement of the reference of the reusable OME in the list to the new reusable OME. Afterward, the process terminates in block 468. Alternatively, if the reusable OME cannot be utilized by the task, further searching of the list of unnamed reusable OMEs could be performed instead of deleting the reusable OME and creating a new reusable OME.

Referring again to block 463, if no more reusable OMEs are present in the list, the process then advances to block 476, which depicts the starting of a new reusable OME, connecting the new reusable OME to the task, and marking the new reusable OME as active. The process also proceeds to block 476 from block 458 if the pool of unnamed OMEs is empty. From block 476, the process proceeds to block 478, which depicts the adding of the reference to the new reusable OME to the list of unnamed OMEs. The process finally terminates in block 468.

A determination of whether or not the pool is empty may be made by searching the list associated with the pool of unnamed OMEs to determine whether any references to unnamed OMEs are present. Again, as mentioned before, a reference is a label, a pointer, or some other mechanism for identifying OMEs in accordance with a preferred embodiment of the present invention.

Figure 6:
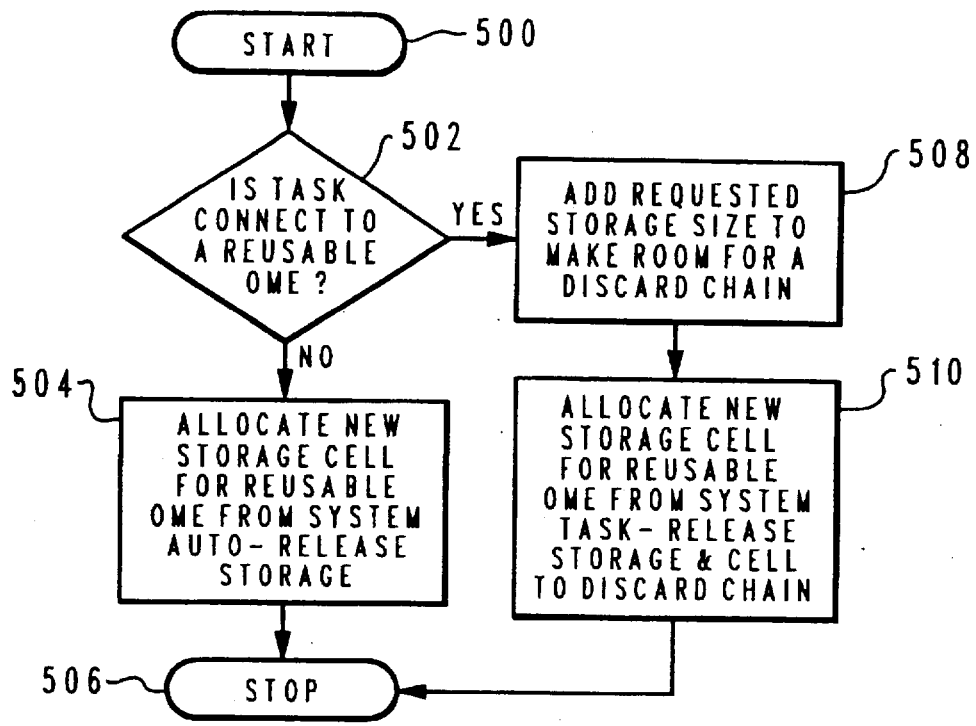
FIG. 6 is a flowchart illustrating a method and system for object management environment memory allocation in accordance with a preferred embodiment of the present invention.

Referring now to FIG. 6, a flowchart illustrating a method for OME memory allocation is depicted in accordance with a preferred embodiment of the present invention. As illustrated the process begins in block 500 and thereafter proceeds to block 502. Block 502 depicts a determination of whether or not the task is connected to a reusable OME. If the task is not connected to a reusable OME, the process then advances to block 504. Block 504 illustrates the allocation of a new storage cell for the reusable OME from system auto-release storage. A storage cell is merely some unit of storage within the data pressing system. The storage may be, for example, memory or a hard disk unit. Auto-release storage is storage within the data processing system that is freed up when the task is completed. Thereafter, the process terminates as depicted in block 506.

Referring again to block 502, if the task is connected to a reusable OME, the process then proceeds to block 508. Block 508 illustrates the addition of storage to the requested storage size to provide storage for a discard chain. A discard chain is a data structure that identifies the storage cells associated with one or more OMEs. This discard chain is utilized to free up storage cells when an OME is no longer needed. Afterward, the process advances to block 510, which depicts the allocation of the new storage cell for the OME from the system task-release storage and adding the cell to the discard chain. Task-release storage is storage that is maintained even after the task is completed. Afterward, the process terminates in block 506.

Figure 7:
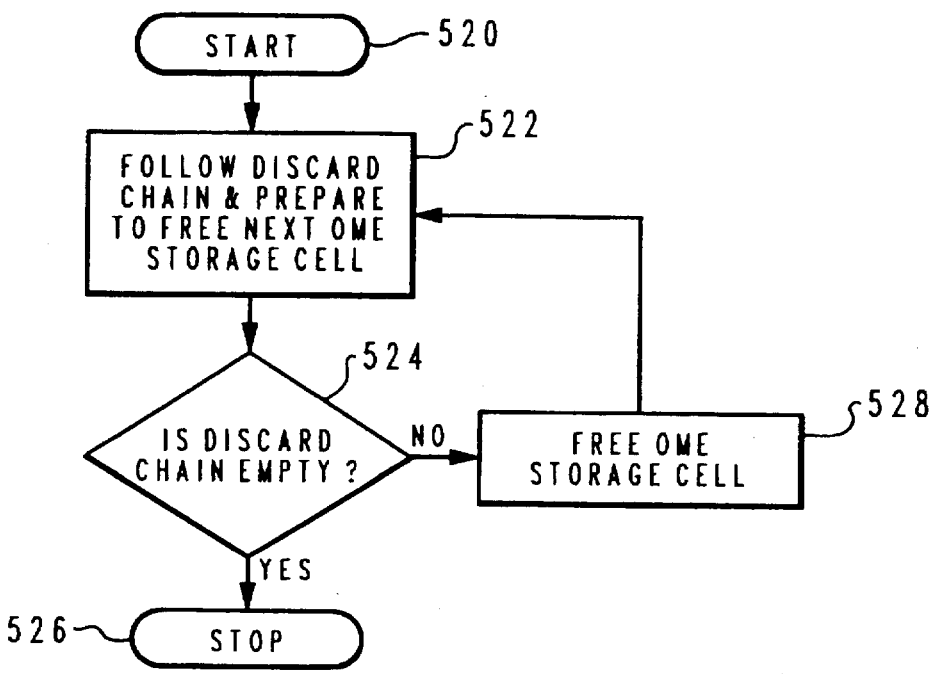
FIG. 7 depicts a method and system for discarding a reusable object management environment in accordance with a preferred embodiment of the present invention.

Referring next to FIG. 7, a flowchart illustrating a method and system for discarding a reusable OME is depicted in accordance with a preferred embodiment of the present invention. As illustrated, the process begins in block 520 and thereafter proceeds to block 522, which depicts following the OME discard chain and preparing to free the next OME memory cell. Afterward, the process proceeds to block 524. Block 524 illustrates a determination of whether or not the OME discard chain is empty. If the OME discard chain is empty, the process terminates as depicted in block 526. On the other hand, if the OME discard chain is not empty, the process then proceeds to block 528. Block 528 illustrates the freeing of the OME storage cell pointed to by the OME discard chain. Thereafter, the process returns to block 522.

Although the depicted embodiment is directed towards connecting OMEs to various tasks performed within a number of facilities, those skilled in the art will realize that OMEs may be connected to applications instead of specific tasks in accordance with a preferred embodiment of the present invention. Those skilled in the art will also realize that any object requiring an OME may be provided a reusable OME in accordance with a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method of increasing efficiency within a data processing system having multiple applications executing within said data processing system, each of said multiple applications requiring a specific object management environment including a least a list of loaded classes and a set of processing flags, said method comprising the data processing system implemented steps of:

storing within said data processing system a collection of parameters specifying an object management environment in response to initialization of said object management environment for utilization by a first application;

determining minimal object management requirements of a second application requesting an object management environment in response to an attempted initialization of said second application; and utilizing said object management environment specified by said stored collection of parameters if said collection of parameters meets said minimal object management requirements of said second application, wherein data processing efficiency is increased.

2. The method of increasing efficiency within a data processing system according to claim 1, further comprising:

retaining said object manacement environment after said first application no longer requires said object management environment.

3. The method of increasing efficiency within a data processing system according to claim 2, further comprising:

maintaining an object management environment list identifying each object management environment that has been initialized and retained along with a collection of parameters specifying said object management environment, wherein said list may be utilized to determine whether a collection of parameters specifying an object management environment meets said minimal object management requirements of an application.

4. The method of increasing efficiency within a data processing system according to claim 3, further comprising:

marking each object management environment in said object management environment list as in use if an application is utilizing said object management environment; and preventing utilization of an object management environment by another application if said object management environment is marked as in use.

5. An apparatus for increasing efficiency within a data processing system having multiple applications executing within said data processing system, each of said multiple applications requiring a specific object management environment including at least a list of loaded classes and a set of processing flags, said system comprising:

storage means for storing within said data processing system a collection of parameters specifying an object management environment in response to initialization of said object management environment for utilization by a first application;

means for determining minimal object management requirements of a second application requesting an object management environment in response to an attempted initialization of said second application; and utilization means, responsive to said means for determining, for utilizing said object management environment specified by said collection of parameters for execution of said second application if said collection of parameters meets said minimal object management requirements of said requesting application.

6. The apparatus of claim 5, further comprising:

retention means for retaining said object management environment after said first application no longer requires said object management environment.

7. The apparatus of claim 6, further comprising:

maintenance means for maintaining an object management environment list identifying each object management environment that has been initialized and retained along with a collection of parameters specifying said object management environment, wherein said list may be utilized to determine whether a collection of parameters specifying an object management environment meets said minimal requirements of an application.

8. The apparatus of claim 7, further comprising:

marking means for marking each object management environment in said object management environment list as in use if an application is utilizing said environment; and prevention means for preventing utilization of an object management environment by another application if said object management environment is marked as in use.

9. The apparatus of claim 8, wherein said object management environment list is maintained in a memory.

10. The apparatus of claim 8, wherein said object management environment list is maintained on a hard drive unit.

11. A data processing system for managing object management environments within said data processing system, each object management environment including at least a list of loaded classes and a set of processing flags, to increase efficiency of an application requiring a specific object management environment, said data processing system comprising:

determination means for determining whether an application requiring a specific object management environment can utilize a reusable object management environment in response to an attempted initialization of said application;

search means for determining whether a reusable object management environment is available;

comparison means for comparing a reusable object management environment with said required object management environment of said application in response to an availability of a reusable object management environment; and connection means for connecting said application with said object management environment if said object management environment fulfills at least a minimum set of parameters for said required object management environment of said application.

12. The data processing system of claim 11, wherein said search means includes:

an object management environment list of reusable object management environments, including parameters specifying each reusable object management environment; and means for comparing parameters of a required object management environment of an application to said parameters within said object management environment list.

13. The data processing system of claim 12, wherein a reusable object management environment is not connected to an application if said reusable object management environment is being utilized by another application.

14. The data processing system of claim 12 further comprising marking means for marking a reusable object management environment as active in response to a connection of said reusable object management environment with an application.

15. A data processing system for managing object management environments within said data processing system, each object management environment including at least a list of loaded classes and a set of processing flags, to increase efficiency of applications requiring specific object management environments, data processing system comprising:

determination means, responsive to a request for an object management environment for an application, for determining whether an object management environment is available;

comparison means, responsive to a presence of an available object management environment, for comparing components for said available object management environment with minimum component requirements for a required object management environment of said application;

connection means for connecting said application with said available object management environment if said components for said available object management environment meets said minimum component requirements of said required object management environment of said application; and initiation means, responsive to an absence of an available object management environment, for starting a new object management environment and connecting said application to said new object management environment, wherein said new object management environment meets said minimum component requirements of said required object management environment of said application.

16. The data processing system of claim 15, further comprising:

determining whether an object management environment should be maintained when an application is finished with said object management environment;

marking said object management environment as inactive in response to a determination that said object management environment should be maintained; and removing said object management environment from said data processing system in response to an absence of a determination that said object management environment should be maintained.

17. A storage device readable by a data processing system and encoding data processing system executable instructions for increasing efficiency within said data processing system, wherein said data processing system includes multiple applications executing within said data processing system, each of said multiple applications requiring a specific object management environment including at least a list of loaded classes and a set of processing flags, the data storage device comprising:

instruction means for storing within said data processing system a collection of parameters specifying an object management environment in response to initialization of said object management environment for utilization by first application;

instruction means for determining minimal object management requirements of a second application requesting an object management environment in response to an attempt in initialization of said second application; and instruction means, responsive to said means for determining for utilizing said object management environment specified by said collection of parameters for execution of said second application if said collection of parameters meets minimal object management requirements of said requesting application.

18. The storage device of claim 17, wherein the storage device is a hard disk drive.

19. The storage device of claim 17, wherein the storage device is a memory for use with said data processing system.

20. A storage device readable by a data processing system and encoding data processing system executable instructions for managing object management environments within said data processing system, each object management environment including at least a list of loaded classes and a set of processing flags, wherein said data processing system includes applications requiring specific object management environments, said storage device comprising:

instruction means for determining whether an object management environment is available;

instruction means, responsive to a presence of an available object management environment, for comparing parameters for said available object management environment with a required object management environment of an application;

instruction means for connecting said application with said available object management environment if said parameters for said available object management environment meet minimum parameters for said required object management environment of said application; and instruction means, responsive to an absence of an available object management environment, for starting a new object management environment and connecting said application to said new environment, wherein said new object management environment meets said minimum parameters for said required object management environment of said application.

21. The storage device of claim 20, wherein the storage device is a hard disk drive.

22. The storage device of claim 20, wherein the storage device is a memory.

* * * * *